G. H. W. LINDHORST.
AUTOMOBILE TRUCK.
APPLICATION FILED AUG. 21, 1915.
1,212,780.
Patented Jan. 16, 1917.
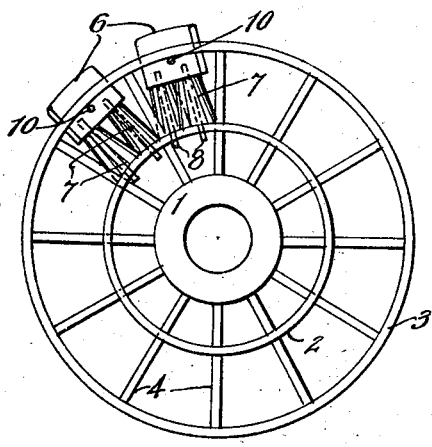
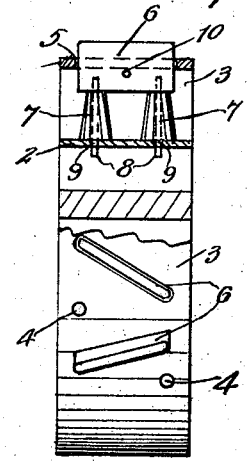
WITNESS
INVENTOR
BY
ATTORNEY

UNITED STATES PATENT OFFICE.

GEORGE H. W. LINDHORST, OF BELLINGHAM, WASHINGTON.

AUTOMOBILE TRUCK.

1,212,780. Specification of Letters Patent. Patented Jan. 16, 1917.

Application filed August 21, 1915. Serial No. 46,624.

*To all whom it may concern:*

Be it known that I, GEORGE H. W. LINDHORST, a citizen of the United States, and a resident of Bellingham, in the county of Whatcom and State of Washington, have invented certain new and useful Improvements in Automobile Trucks, of which the following is a full, true, and exact specification.

My invention relates to improvements in wheels, and particularly to the traction elements on the periphery.

The object of the invention is to provide improvements in the specific construction and the mounting of the cleats to obtain traction as the wheel passes over the road surface.

In the drawing:—Figure 1 is a side elevation of a wheel constructed in accordance with my invention. Fig. 2 is an end view, parts being shown in section to illustrate one of the cleats and its mounting.

1 indicates a hub, 2, an inner rim, 3, an outer rim, and 4, spokes extending from the hub and through the inner rim to the outer rim.

The outer rim is provided with a series of slots 5, arranged at an angle to the axis of the wheel. Slidably mounted in each slot is a cleat 6, and between the inner end of same and the inner rim are two tapered blocks of rubber 7—7, the enlarged base portions of which are seated on said inner rim. Secured to the inner end of the cleat are two guide pins 8—8, which pass through openings formed in the rubber blocks, and through openings 9—9 formed in the inner rim. A pin 10 is passed through the cleat, and engages the inner surface of the outer rim, to prevent said cleat falling from the opening.

Of course it will be understood that the cleats are all similarly mounted, and that they may be arranged in different angles, as shown in Fig. 2.

In operation, as the wheel rotates, the cleats contact with the road surface and compress the rubber blocks. The tapered formation of the blocks gradually increases the resistance of the inward movement of the cleats, inasmuch as the wide base portions act to resist the compression of the narrow outer portion, the amount of compression of the rubber depending of course on the amount of load strain. Immediately the cleats leave the road surface in the rotation of the wheels, the rubber blocks exert outward pressure on the cleats and force same beyond the periphery of the outer rim, this movement however being determined by the pin 10.

Having described my invention what I claim as new and desire to protect by Letters Patent is:—

A wheel comprising a hub, an outer rim, an inner rim, spokes extending from the hub through the inner rim to the outer rim, a plurality of cleats extending through openings formed in the outer rim, said cleats being arranged at an angle to the horizontal plane of the periphery of the outer rim, a pair of rubber blocks interposed between the inner end of each cleat and the inner rim, each rubber block being tapered to form a wide base to rest on the inner rim, pins secured to the cleats and extending through the rubber blocks and the inner rim, and pins extending through the cleats inside the outer rim to prevent said cleats falling from their openings.

GEORGE H. W. LINDHORST.

Copies of this patent may be obtained for five cents each, by addressing the "Commissioner of Patents, Washington, D. C."